Inventor:
Francisc C. Schwarz,
by His Agent.

Inventor:
Francisc C. Schwarz,
His Agent.

Inventor:
Francisc C. Schwarz,
by Dudley I. Reedy
His Agent.

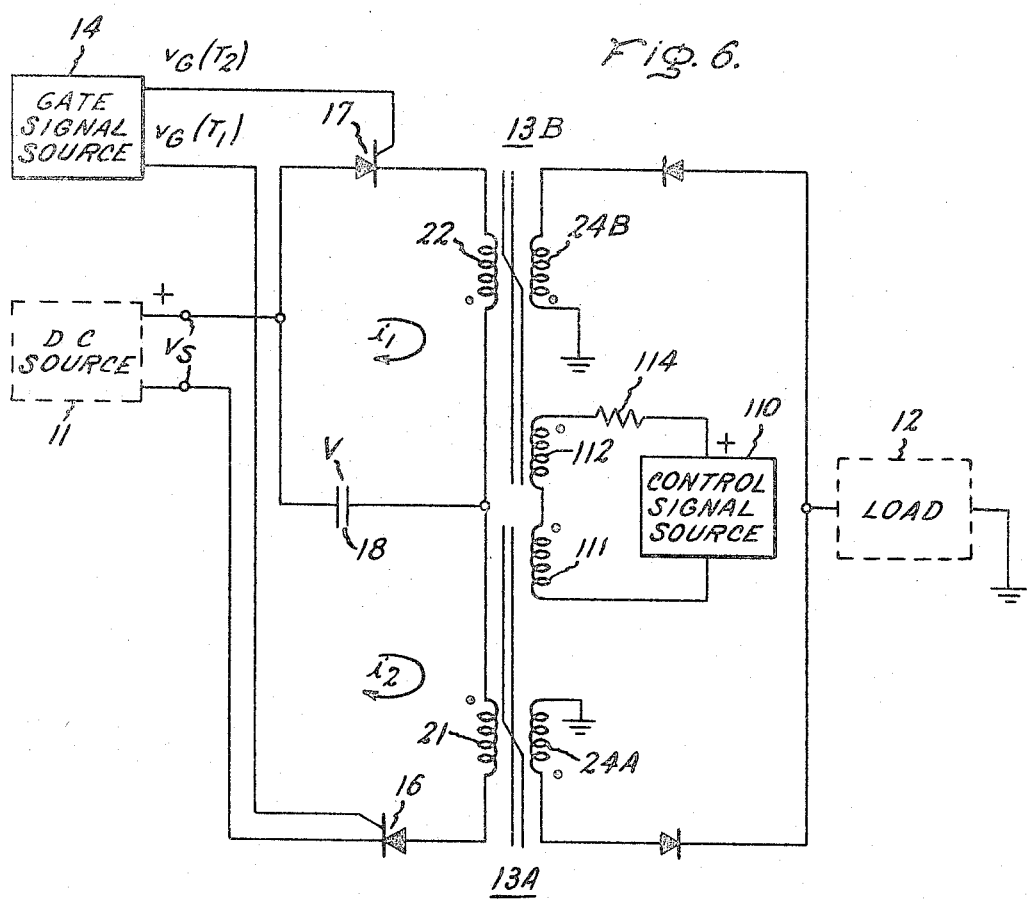

United States Patent Office 3,332,001
Patented July 18, 1967

3,332,001
SELF-STABILIZING SERIES INVERTER-AMPLIFIER PULSE DURATION MODULATION AMPLIFIER
Francisc C. Schwarz, Ithaca, N.Y., assignor to General Electric Company, a corporation of New York
Filed Aug. 1, 1963, Ser. No. 299,212
11 Claims. (Cl. 321—11)

This invention relates to an improved amplifier of the inverter type which provides a stabilized output in the presence of supply voltage and load variations. With only a small fraction of the switching losses of conventional circuits, the invention substantially reduces the frequency limitations normally encountered.

The invention is suited for use in servo-system motor controls and power supplies, and it is also suited for power amplification of audio signals. It is particularly useful for DC to AC conversion, and it is easily adapted to various operating modes such as DC to DC and AC to AC conversion by suitable input and output circuits.

Pulse duration modulation (PDM) in general is an established technique in the field of voltage regulation. It has been justified primarily because it eliminates the DC drop in a dissipative series-regulating devices, with the undesirable problems of efficiency, heat, and often reliability.

The PDM amplifier requires consideration of the inertia-like effects of large current changes per unit of time, especially when the pulse times are in the order of microseconds. This is simply illustrated by the fact that a one-ampere current (registered by a conventional ampere meter) corresponds to the motion of a charge of one coulomb per second. It may, however, actually consist of current pulses with a repetition rate in the kilocycle range and with rates of change of charge in the order of one million coulombs per second$^2$, or $10^6$ amperes per second. When the transient behavior of these circuits is studied, the inertia-like effects of these charges pose appreciable problems when moving at these rates of change through storage and dissipative elements.

At the termination of each half-cycle in transistor-driven PDM amplifiers, energy is stored in the leakage inductance, the air gap of the transformer, and the apparent capacitance storage effect of the power transistors. These undesired parasitic storage elements will dissipate the available energy in the resistive components of the primary inverter circuit—the resistances of the transformer wire and the semiconductor. The distribution of this lost energy will occur according to the ratio of resistances of these two elements. The high resistance of the transistors in the process of opening will essentially absorb all of this energy, leading to the well known heating problem. Consider one of these storage elements—the leakage reactance, which may be in the order of tens of microhenries. Assume for the sake of discussion a leakage inductance at 50 microhenries carrying an instantaneous current of 10 amperes. An energy loss of $$\tfrac{1}{2}LI^2 = \tfrac{1}{2}(50 \times 10^{-6})(100) = 2.5 \text{ millijoules}$$

per half-cycle will result. The fact that this quantity is expressed per half-cycle indicates that a loss per second proportional to its repetition rate is involved. The loss shown in this example at 4-kc. operation rises to 20 watts and this loss is compounded by the loss due to the energy sistances of these two elements. The h igh resistance of loss. This limits the speed of operation. A similar situation arises when using the controlled rectifier as a switching element. The leakage reactance and air gap loss remain unchanged while the energy loss in the forced controlled rectifier turn-off operation takes the place of transistor switching losses.

Another problem with static inverter type circuits is that spurious changes in circuit operating conditions occasionally cause catastrophic short circuits. For example, if a pair of power switching controlled rectifiers are simultaneously "ON," an essentially closed circuit condition between the power supply terminals can occur which produces a current surge from the power supply that burns out elements in the supply.

Accordingly, it is an object of this invention to provide a stabilized PDM amplifier in which its switching elements will dissipate essentially only the power due to their conduction losses, and the power losses due to switching (commutation) currents, commonly found in inverters, are substantially reduced.

It is a further object of the invention to provide a power inverter in which voltage regulation is not dissipative and in which the operating frequency is not narrowly limited by semiconductor switching losses.

It is also an object of the invention to provide a stabilized amplifier which has self-protecting features against overload conditions.

It is also an object of the invention to provide an amplifier capable of operating in the hundreds of kilocycles frequency range.

Briefly stated, in accordance with certain aspects of the invention, an improved static inverter type circuit is provided. A pair of electronic switching elements and a storage capacitor are arranged between a D.C. source and a load. An integrator such as a saturable reactor regulates the voltage output in accordance with a preset limit of volt-seconds of energy. The electronic switching elements are of a type which are turned "off" when a reverse current is applied, such as is the case with silicon controlled rectifiers, for example. The power circuit is adapted to operate an LC resonant circuit, at the termination of each cycle. This brings about resonant overcharging of the capacitor whereby one switching element is turned off and discharge takes place through the second switching element which is activated by a reference timing signal or the equivalent. The essential characteristic is the resonant turn-off of the power switching elements after the termination of a predetermined integration period.

These and other objects and features of this invention will become apparent from the accompanying detailed description and drawings in which:

FIGURES 4, 5 and 6 are alternative embodiments of the invention.

Figure 1:
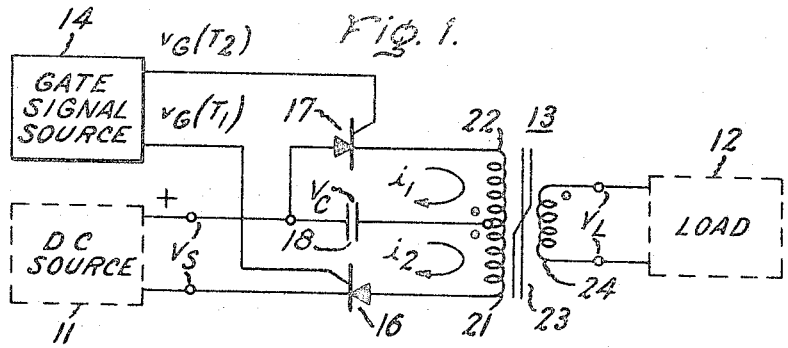
FIGURE 1 is a schematic diagram of a first embodiment of the invention.

Referring now to the drawings, FIGURE 1 illustrates a first embodiment of the inverter invention, in schematic form, which is useful as a voltage stabilizer. A source of DC voltage 11 supplies AC power to a load 12 which is voltage stabilized by a saturable transformer 13. In this embodiment, the invention lies essentially in the arrangement for terminating the pulses derived from DC source 11 without significant power loss. For the first half cycle, a pulse is initiated by gate signal source 14 applying a pulse $v_G(T_1)$ to the gate of a silicon controlled rectifier 16. This closes a series circuit from DC source 11 through a first primary winding 21 of saturable transformer 13 and a series storage capacitor 18. This induces a pulse in the secondary winding 24 which is applied to load 12. The saturable transformer operates as an integrator which inherently limits the volt-time integral applied to the load signal. After the core 23 of transformer 13 is saturated, the core produces negligible coupling to the load 12. During this portion of the first half cycle $T_1$, capacitor 18 is being charged. A resistance loaded unsaturated saturable transformer 13 appears as a series resistor and capacitor 18, having a capacitance C, is exponentially charged with a time constant $a^2R_LC$, where $a$ is the turns ratio and $R_L$ is the effective resistance of the series circuit. After transformer 13 saturates, winding 21 appears as an air core inductor having an inductance $L_O$. During the continued charging, the former RC circuit becomes a series resonant $L_OC$ circuit which is oscillatory. As capacitor 18 continues to charge, the voltage across it, $V_C$, increases. By virtue of the inductance $L_O$, current $i_1$ continues to flow after $V_C$ equals $V_S$. The overshoot terminates quickly, but not before turning silicon controlled rectifier 16 "off" by means of the back bias placed on the controlled rectifier 16. By this operation, the electronic switching element is turned "off" with negligible power dissipation.

The second half cycle $T_2$ is essentially the converse of the first half cycle. The gate signal source 14 initiates the negative half cycle by applying a pulse $v_G(T_2)$ to the gate of silicon controlled rectifier 17. This closes the series circuit for discharging storage capacitor 18 through a secondary primary winding 22 of saturable transformer 13. Winding 22 is wound so that when the current $i_1$ flows in the direction indicated by the arrow in FIGURE 1, which is the case when capacitor 18 discharges, a signal is induced in secondary winding 24 having a polarity opposite to that induced during the first half cycle $T_1$ when the current $i_2$ flows in the direction indicated while capacitor 18 is charged. As a result, the discharge of storage capacitor 18 produces a negative load signal pulse which is regulated by the volt-time integral characteristic of saturable core 23. After transformer 13 is reset, the capacitor 18 continues to discharge and overshoots the discharged state because of the inductance $L_O$ of winding 22. As a result, the voltage across capacitor 18 reverses polarity and the oscillatory condition causes the controlled rectifier 17 to be turned "off" by the reverse bias.

Figure 3:
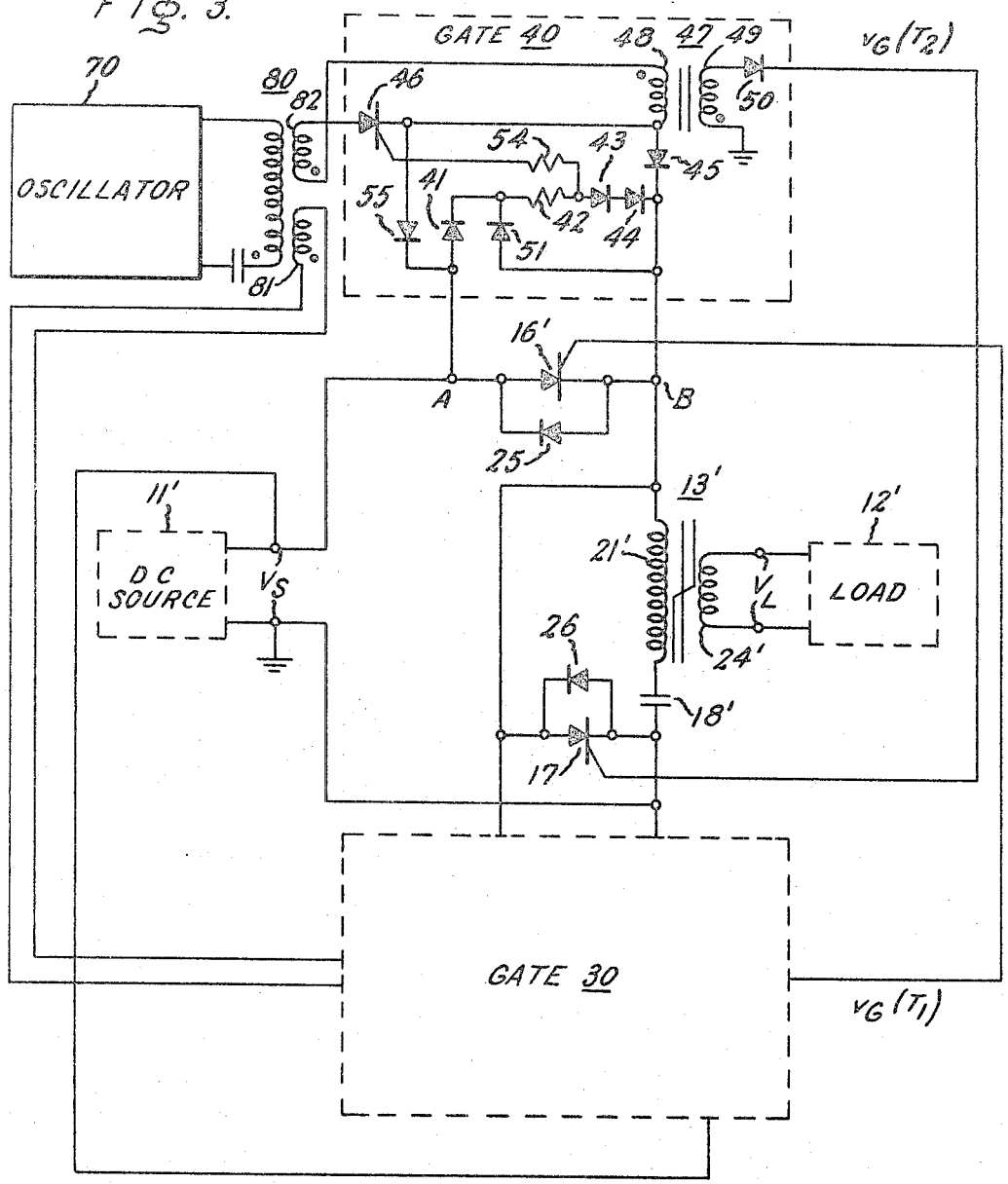
FIGURE 3 is a schematic diagram of a preferred embodiment of the invention.

FIGURE 3 is a schematic diagram of a preferred embodiment of the invention which incorporates refinements over the FIGURE 1 amplifier for preventing short circuit conditions and for providing a discharge circuit for the storage capacitor. In the FIGURE 3 circuit, components corresponding to those illustrated in the FIGURE 1 circuit are represented by primed reference characters. The source 11' is coupled to a load 12' through a pair of switching semiconductor elements, which in this embodiment are in the form of controlled rectifiers 16' and 17', a series capacitor 18', and a saturable transformer 13'. Controlled rectifiers 16' and 17' are also coupled to gates 30 and 40 which correspond to the gate pulse source 14 in FIGURE 1. These gates transmit firing pulses to the firing gates of controlled rectifiers 16' and 17' and perform a logic protection function to prevent one controlled rectifier from being fired while the other is conducting. The winding 21' on the saturable transformer 13', in addition to driving the load while storage capacitor 18' is charged, also drives the load during the second half cycle when capacitor 18' discharges.

In operation, an oscillator 70 generates a square wave which is differentiated by transformer 80 to produce gate pulses of opposing polarity on respective secondary windings 81 and 82. Windings 81 and 82 are coupled, respectively, to gates 30 and 40. When point A is sufficiently positive with respect to point B—in the order of 2½ volts or more—a minimum conduction voltage for diodes 43 and 44 is exceeded and current flows through diode 41, resistor 42, and diodes 43 and 44, to point B. Controlled rectifier 16' must be open for this condition to occur. This current flow causes a voltage drop of about 1.2 volts on diodes 43 and 44, sufficient to fire controlled rectifier 46.

A pulse on winding 82 can only be transmitted to transformer 47 when controlled rectifier 46 is closed. Hence, when the aforesaid condition is fulfilled, a signal appears on transformer 47 and it passes through diode 50 on to gate controlled rectifier 17', firing that rectifier.

As described above, gate 40 is closed when controlled rectifier 16' is "off" and has a positive voltage drop thereacross from point A to point B. It is also desirable to close gate controlled rectifier 46 when the controlled rectifier 16' is "off" but has a reverse bias from point B to point A. Expressed another way, it is sufficient if gate controlled rectifier 46 is closed whenever the power switching controlled rectifier 16' is "on," that is, with a small forward bias. Accordingly, point B is connected to the gate of controlled rectifier 46 in the same way as point A, but through rectifier 51. The resistors 42 and 54 are large impedances which limit the gating signal to the negligible power levels necessary to fire controlled rectifier 46. The rectifiers 41, 45, 51 and 55 are provided so as to permit a voltage from either point A or point B, or point B to point A, which is sufficiently large so as to produce the requisite voltage across diodes 43 and 44, to fire controlled rectifier 46 and permit the application of a gating pulse to controlled rectifier 17'.

Since the pulse appearing on winding 81 of transformer 80 will be of opposite polarity to that appearing on winding 82, there will be negative bias on the anode of the counterpart of diode 50 in gate 30, and no current will pass through this diode.

As a result of this protection circuit, the switching elements 16' and 17' can never be closed at the same time. This feature, in conjunction with the basic circuit feature of a storage capacitor 18 in series with both switching elements, makes the inverter short circuit proof.

The basic operation of the FIGURE 3 amplifier is similar to that in FIGURE 1. During alternate half cycles of driving oscillator 70, controlled rectifier 16' is fired. At saturation of transformer 13', the voltage applied to load 12' is cut off and the circuit is transformed from an RC circuit to an LC circuit, with capacitor 18' charging according to the level of source 11' and then to a resonant overshoot. That is, its behavior becomes that of an oscillatory circuit and controlled rectifier 16' will open as the current tends to reverse. Shortly thereafter, controlled rectifier 17' is fired by gate 40 whereupon capacitor 18' will discharge to the source reference teminal through this rectifier. Now load 12' is again coupled into the circuit and the previously described process is duplicated but in a reversed manner during the second half cycle.

Under some reactive load conditions, the series capacitor 18' can accumulate a net charge. This can be obviated in a number of ways of which the simplest is to connect a pair of diodes 25 and 26 in shunt with respective controlled rectifiers 16' and 17' so that a capacitor discharge path to the source 11' is provided. As a result, during the time controlled rectifier is "off," capacitor 18' can discharge accumulated charge around the controlled rectifiers back to the source. It will be obvious to those skilled in the art that numerous kinds of capacitor discharge circuits can be employed.

Figure 4:
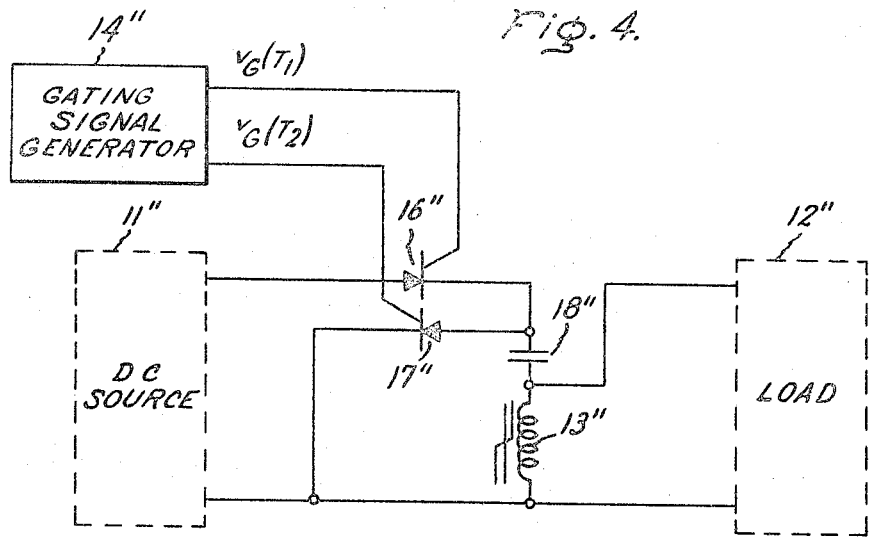
Figure 5:
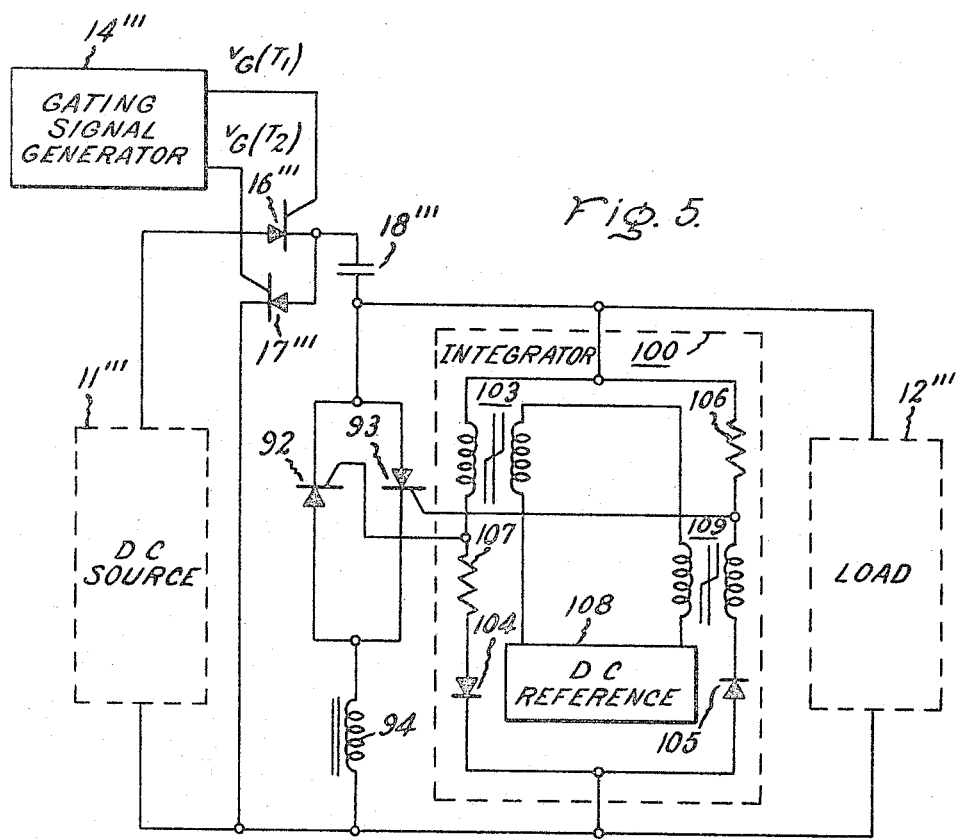

FIGURE 4 is a variation of FIGURES 1 and 5 where saturable reactor 13" replaces saturable transformer 13 and is connected in parallel with the load 12". Upon saturation, saturable reactor 13" becomes effectively a short circuit, causing the voltage across load 12" to become zero. Hence, saturable reactor 13" functionally embodies the integrator and load switching functions of FIGURE 3.

FIGURE 5 illustrates a modification of the FIGURE 4 embodiment where the load shunt switching function is provided by separate switches and the integration circuit is made adjustable in its volt-time content. This is depicted by controllable integrator circuit 100. The integration function of saturable reactor 13" in FIGURE 4 is performed jointly by saturable transformers 103 and 109 in FIGURE 5. A D.C. reference source 108 resets each transformer during its "off" time by driving it part way toward saturation in one direction. Then during the respective "on" time for each transformer, it is driven in the opposite direction to saturation whereupon a gating signal is transmitted to one of the shunt switching elements, controlled rectifiers 92 and 93, shorting out load 12''' and the saturable transformer involved.

Figure 2:
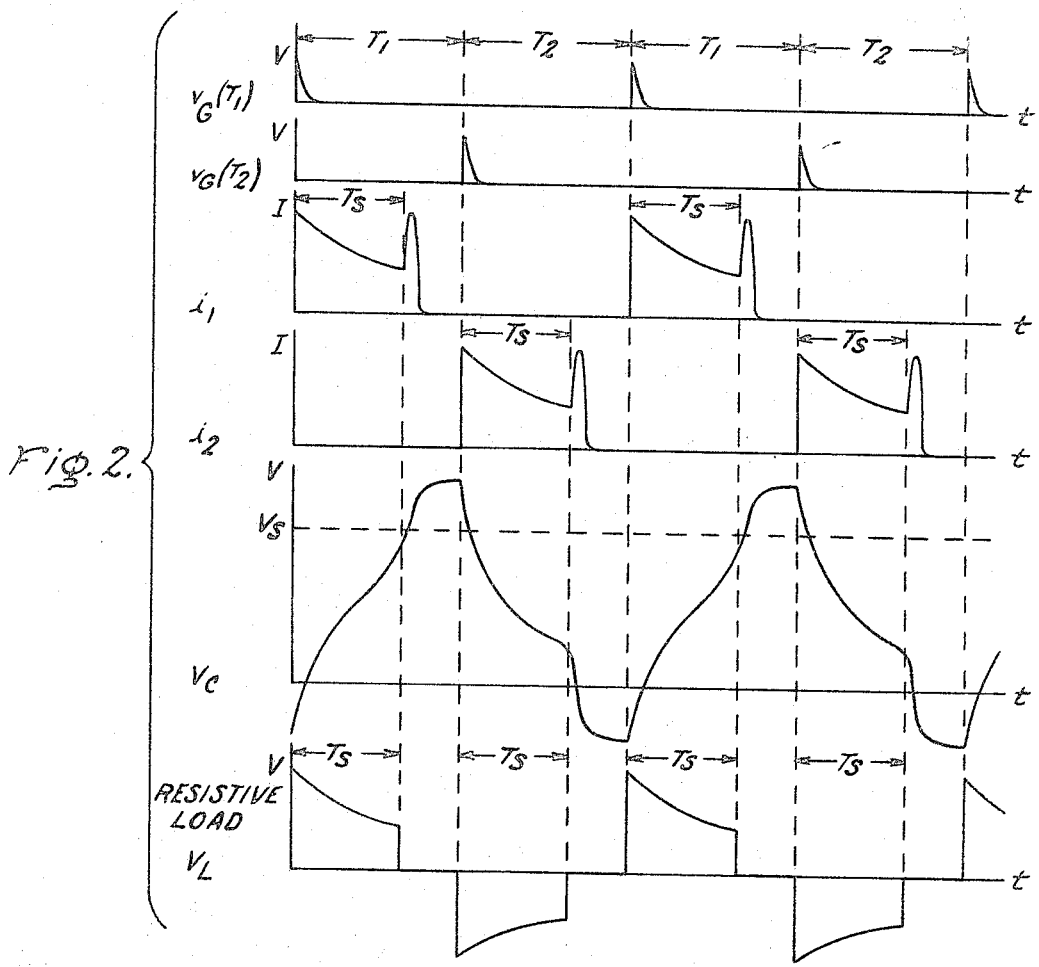
FIGURE 2 is a series of waveforms illustrating the operation of the FIGURE 1 apparatus.

When saturable transformer 109 has accumulated a preset limit of volt-seconds, actuated controlled rectifier 92 thereby shorting the current, and eliminated the voltage on load 12''', the RC circuit now becomes an LC circuit as the current is switched from saturable transformer 109 and resistance 104 to choke 94. Capacitor and load voltages follow the same sequence as before, as shown in FIGURE 2. Upon reaching an overshoot charge, capacitor 18'''' turns off controlled rectifiers 16'''' and 17'''' by resonant discharge action. Then controlled rectifier 17'''' is fired by gating signal generator 14'''' with capacitor 18'''' discharging to the source reference terminal. After integrator 100 has accumulated an ensuing charge of reverse volt-seconds to its preset limit, it actuates a second shunt switching semiconductor, controlled rectifier 93, permitting capacitor 18'''' to discharge in an LC manner to the line reference voltage and then to a resonant undershoot. It is to be understood that the incorporation of a logic protection function is optional in gating signal generator 14'''' as it also is in the other embodiments disclosed.

In the embodiments of FIGURES 1–4, the saturable transformers and reactors 13, etc. perform three major functions: volt-second integration of the load signal, power switching to remove the source from the load, and after this switching the saturable elements provide an inductance in series with the series capacitance which resonantly turns off the inverting switches with little power loss. As is evident from the FIGURE 5 embodiment, it is not necessary that these three functions be performed by the same component. Any suitable components or circuits which perform the required functions can be used. The embodiments illustrated utilize silicon controlled rectifiers as the inverting power switches because these switches have the best switching characteristics of presently available components. It will be obvious to those skilled in the art that other components such as transistors which are protected from destructive reverse currents, etc. can be employed.

As has been indicated above, the inverter circuits disclosed can be employed for amplifier applications other than voltage stabilization such as motor control. For example, the FIGURE 5 embodiment can be used without modification by controlling integrator 100 in accordance with the desired variable power output. That is, reference source 108 can serve as a variable control signal source which linearly varies the average amplitude of the signals applied to the load 12'''.

FIGURE 6 illustrates a modification of the FIGURE 1 inverter circuit to provide a similar amplifier operation. A pair of saturable transformers 13A and 13B are provided so that the integration limits can be varied. A control signal source 110 produces a variable DC control signal which resets the respective saturable transformers through windings 111 and 112 during the alternate half cycles in a manner analogous to that found in magnetic amplifiers.

While particular embodiments of the invention have been shown and described herein, it is not intended that the invention be limited to such disclosure, but that changes and modifications can be made and incorporated within the scope of the claims.

What is claimed is:
1. An inverter circuit comprising:
 (a) a series storage capacitor;
 (b) first switching means for connecting a source of electrical energy to charge said capacitor and to drive a load;
 (c) a second switching means to connect said capacitor to discharge through the load;
 (d) an inductance means in series with said first and second switching elements for providing a resonant turn off circuit therefor;
 (e) integrator means coupled to the load for sensing the volt-time integral of the power applied to said load; and
 (f) third switching means responsive to said integrator for periodically removing power from the load to provide pulse duration modulation.
2. In an inverter type of amplifier in which power is applied to a load in the form of a train of pulses of alternating polarities, the combination comprising:
 (a) first and second switching elements for providing inversion switching of the source of power, said switching elements being of a type which conduct in a first direction when turned on and which are turned off when biased in a reverse direction;
 (b) a series storage capacitor;
 (c) inverter circuitry for providing a connection for input power pulses to a load in series through said first switching element and said capacitor and to provide a connection through said second switching element for discharging said capacitor into said load; and
 (d) control means for providing voltage stabilization integration of the signal applied to a said load and terminating the load pulses in accordance therewith and for providing an LC series resonant condition after each pulse to turn off the respective switching elements by back biasing.
3. A self-stabilizing amplifier comprising:
 (a) a storage capacitor;
 (b) a first switching element connecting an input power source through said capacitor in series to a load;
 (c) a second switching element connecting said storage capacitor for discharge through said load;
 (d) gating means for transmitting actuating signals to each of said switching elements; and
 (e) an integrator coupled in series with the input power source and said storage capacitor, said integrator being arranged to provide pulse duration modulation of the power applied to the load and to provide an inductance to resonate with said storage capacitor for turning off said switching elements successively.
4. The amplifier of claim 3 further comprising:
 (f) modulator means for varying said integrator's limits in accordance with a variable amplitude input signal.
5. The amplifier of claim 3 further comprising:
 (f) means for discharging accumulated charges on said storage capacitor.
6. An inverter type circuit comprising:
 (a) an output transformer having primary and secondary windings connecting power to a load;
 (b) a series storage capacitor serially connected to the primary of said transformer;
 (c) a first controlled rectifier connected to a primary winding on said transformer in series with said capacitor;
 (d) a second controlled rectifier connected to discharge said capacitor through a primary winding on said transformer when turned on;
 (e) oscillator means for alternately turning on said controlled rectifiers; and
 (f) circuit means including said transformer for terminating each of the pulses in accordance with volt-time integration and for providing LC resonant turn off of said controlled rectifiers.

7. The inverter circuit of claim 6, further comprising:
(g) gate protection means coupled in parallel with each of said controlled rectifiers and adapted to prevent application of turn on pulses to the other controlled rectifier for preventing short circuits.

8. An inverter type circuit comprising:
(a) shunt switching means shunt connected to disconnect power to a load;
(b) a series storage capacitor coupled to the load;
(c) a first controlled rectifier series connected to couple power to the load in series with said capacitor;
(d) a second controlled rectifier connected to discharge said capacitor through the load when turned on;
(e) oscillator means for alternately turning on said controlled rectifiers; and
(f) circuit means including said shunt switching means for terminating each of the pulses in accordance with volt-time integration and for providing LC resonant turn off of said controlled rectifiers.

9. The inverter circuit of claim 8 further comprising:
(g) gate protection means connected in parallel with each of said controlled rectifiers in such a manner as to prevent application of turn on pulses to the other controlled rectifier for preventing short circuits.

10. The inverter circuit of claim 8 wherein said shunt switching means and said circuit means is comprised of at least one saturable reactor.

11. The inverter circuit of claim 8 wherein said circuit means includes a separate control integrator which is connected in parallel with the load for deriving control signals for said shunt switching means to produce pulse duration modulation.

References Cited

UNITED STATES PATENTS

| | | | |
|---|---|---|---|
| 3,134,048 | 5/1964 | Wollframm et al. | 328—67 X |
| 3,192,409 | 6/1965 | Rainer et al. | 307—88.5 |

JOHN F. COUCH, *Primary Examiner.*

W. H. BEHA, *Assistant Examiner.*